United States Patent [19]

De Castro

[11] Patent Number: 5,256,448
[45] Date of Patent: Oct. 26, 1993

[54] SOL-GEL METHOD OF MAKING SILICON CARBIDE AND OF PROTECTING A SUBSTRATE

[75] Inventor: Luiz D. De Castro, Bradford on Avon, England

[73] Assignee: British Technology Group Ltd., London, England

[21] Appl. No.: 775,124

[22] Filed: Oct. 11, 1991

[30] Foreign Application Priority Data

Oct. 25, 1990 [GB] United Kingdom ............... 9023268

[51] Int. Cl.$^5$ ............................................. B05D 3/02
[52] U.S. Cl. .................................. 427/228; 427/397.7; 423/345
[58] Field of Search .............. 427/376.2, 397.7, 429, 427/228; 501/12, 88, 95; 423/345; 428/446, 450

[56] References Cited

U.S. PATENT DOCUMENTS

| | | | |
|---|---|---|---|
| 3,455,723 | 7/1959 | Kern | 117/47 |
| 4,410,502 | 10/1983 | Yamaguchi et al. | 423/345 |
| 4,471,023 | 9/1984 | Shuford | 427/379 |
| 4,500,504 | 2/1985 | Yamamoto | 423/345 |
| 4,544,412 | 10/1985 | Veltri et al. | 501/88 |
| 4,585,675 | 4/1986 | Shuford | 427/397.7 |
| 4,690,909 | 9/1987 | Okuno et al. | 501/88 |
| 4,694,040 | 9/1987 | Hashimoto et al. | 524/765 |
| 4,818,732 | 4/1989 | Fox et al. | 501/81 |
| 5,045,399 | 9/1991 | Niebylski | 501/92 |

FOREIGN PATENT DOCUMENTS

| | | | |
|---|---|---|---|
| 0052487 | 5/1982 | European Pat. Off. | |
| 52487 | 5/1982 | European Pat. Off. | 423/345 |
| 0134769 | 3/1985 | European Pat. Off. | |
| 58-91026 | 5/1983 | Japan | 423/345 |
| 58-91061 | 5/1983 | Japan | 501/95 |
| 58-104010 | 6/1983 | Japan | 423/345 |
| 58-213620 | 12/1983 | Japan | 423/345 |
| 60-246265 | 12/1985 | Japan | 501/88 |
| 955629 | 4/1964 | United Kingdom | |
| 1199953 | 7/1970 | United Kingdom | 423/345 |

OTHER PUBLICATIONS

White, D. et al., "Preparation of Silicon Carbide from Organosilicon Gels: I, Synthesis and Characterization of Precursor Gels," Advanced Ceramic Materials, vol. 2 (1987) pp. 45-52.

White, D. et al., "Preparation of Silicon Carbide from Organosilicon Gels: II, Gel Pyrolysis and SiC Characterization," Advanced Ceramic Materials, vol. 2 (1987) pp. 53-59.

Wei, G., "Process for Preparing Fine Grain Silicon Carbide Powder," U.S.-A644576 (undated).

Sugahara, Y. et al., "The Preparation of Boron-Doped Silicon Carbide Powder by the Carbothermal Reduction of Oxides Derived from the Hydrolyzed Methyltriethoxysilane", J. Non-Crystalline Solids, vol. 100 (1988) pp. 542-546).

Park, S. et al., "Reaction Sintering of Gel Derived Ceramic Composites", J. Non-Crystalline Solids, vol. 100 (1988) pp. 345-351.

Brinker, C., "Hydrolysis and Condensation of Silicates: Effects on Structure," J. Non-Crystalline Solids, vol. 100 (1988) pp. 31-50.

(List continued on next page.)

Primary Examiner—Terry J. Owens
Attorney, Agent, or Firm—Nixon & Vanderhye

[57] ABSTRACT

Method of making a coherent film of silicon carbide on a surface, comprising forming a solution in the solvent of from 0.05 to 0.3 moles alkoxy silicon per mole of water, the solution also containing an acid catalyst and a carbonaceous material in the ratio 1 to 3 moles carbon per mole of silicon. Hydrolysis is allowed to occur followed by removal of volatile material after hydrolysis at this or an earlier stage; applying the solution to the surface; and thereafter heating at at least 1300° C. The solvent comprises 0.3 to 1 mole of acetone per mole of water.

12 Claims, No Drawings

OTHER PUBLICATIONS

Strife, J. et al., "Ceramic Coatings for Carbon–Carbon Composites," Ceramic Bull., vol. 67 (1988) pp. 369–374.

Fox, J. et al., "Pyrolysis of Organosilicon Gels to Silicon Carbide," Mat. Res. Soc. Symp. Proc., vol. 73 (1964) pp. 395–400.

Wei, G. et al., "Synthesis of Sinterable SiC Powders by Carbothermic Reduction of Gel-Derived Precursors and Pyrolysis of Polycarbosilane", Am. Ceram. Soc. Bull., vol. 63 (1984) pp. 1054–1061.

Chen, K. et al., "Silicon Carbide via the Hydrolysis-Condensation Process of Dimethyldiethoxysilane/Tetraethoxysilane Copolymers", Mat. Res. Soc. Symp. Proc., vol. 121 (1988) pp. 571–574.

JP 58213620, English Derwent Abstract (Dec. 1983). Chem ABS 176318c (1984).

JP 58091026, English Derwent Abstract (May 1983). World Patents Index Latest Week 5050, Derwent Publications Ltd., London, GB; AN 90-372899 & JP A-2-270 508 (Ibiden Co Ltd., JP) Nov. 5, 1990.

SOL-GEL METHOD OF MAKING SILICON CARBIDE AND OF PROTECTING A SUBSTRATE

This invention relates to a sol-gel method of making silicon carbide. It also relates to a sol-gel method of protecting a substrate.

The protection of a substrate against high temperature oxidation can bring important benefits. Thus, superalloys and ceramics can be used up to 1100° C. and 1650° C. respectively, while carbon materials retain their mechanical properties up to 2500° C. However, this capability is somewhat theoretical since, normally, carbon materials will oxidise from about 500° C. upwards. A successful method of protecting them could allow them to replace superalloys and ceramics in suitable applications.

According to the present invention, a method of making silicon carbide comprises forming a solution of from 0.05 to 0.3 preferably 0.08 to 0.17 moles alkoxysilicon per mole of water, the solution also containing an acid catalyst and a carbonaceous material in the ratio 1 to 3 moles preferably 1½–2½ (e.g. 1¾–2¼) moles carbon per mole of silicon, and optionally also up to 1 (e.g. ¼–¾) mole of a $C_{1-4}$ alcohol, allowing hydrolysis to occur, removing volatile material after hydrolysis, and thereafter heating at at least 1300° C., characterised in that the solvent comprises or is acetone.

Preferably the alkoxysilicon is trialkoxysilicon e.g. $CH_3Si(OC_2H_5)_3$ or tetraalkoxysilicon, such as $(CH_3O)\text{-}Si(OC_2H_5)_3$ or tetraethoxysilicon. Preferably the acid catalyst is any of HCl, $HNO_3$, $H_2SO_4$ and acetic acid. HF can also be used especially for making powdered silicon carbide but is less preferred for coating substrates (described later). Preferably the molar proportion of acetone to water is from 0.3:1 to 1:1 (especially for coating substrates). Preferably the carbonaceous material is any of polyacrylonitrile and an epoxy, furan or phenolic resin.

Optionally fibres such as of carbon, preferably of length less than 150 μm, preferably of diameter from 1 to 50 e.g. 5 to 12 μm, and/or graphite powder and/or phenolic resin, are added to the mixture, in a volume fraction of up to 40%. High volumes can lead to less reliable coatings. The materials are preferably chosen to have a coefficient of thermal expansion comparable with that of carbon materials forming a substrate to be protected (described later).

Preferably the alkoxide was allowed to hydrolyse for from 1 to 3 hours at from 50° to 70° C., an additional ½–1½ hours at 60° to 80° C. being possible, and the hydrolysed solution was allowed to gel at from 40° to 70° C. with 60° C. being most preferred.

Preferably the hydrolysed solution is converted to silicon carbide by heating at at least 1300° C., preferably at least 1350° C., more preferably at least 1400° C., most preferably at least 1425° C., and in certain cases (where it may perhaps need to be outgassed prior to applying a glass layer, which might typically be melted at 1600° C.) exceeding 1550° C., for from 2 to 12 preferably 3 to 6 hours, preferably in a non-oxidising atmosphere.

Preferably the hydrolysed solution is applied by brushing to a surface. A drying retarder such as glycerol, formamide or oxalic acid may be present if desired, in a proportion from ½ to 2 (e.g. 1) mole per mole of silicon.

We turn now to that aspect of the invention which relates to protecting a substrate. Carbon and graphite materials find many applications in industry, e.g. as electrodes in steel and aluminium manufacture, and as high performance materials in aerospace applications. For the latter area a range of carbon-carbon composites have been developed which have excellent high specific strength and stiffness at high temperature, and do not suffer from creep. However, all carbon materials are subject to a severe limitation which is the tendency to oxidise in air and other oxidising environments. Consequently, a great deal of effort has been devoted to the development of coatings and other methods to control oxidation of carbons and graphites. For example, the leading edges of the US Space Shuttle are manufactured from a carbon-carbon composite which is protected from oxidation by a multi-layer coating based upon silicon carbide. Most coating methods for control of oxidation of carbons can be classified into three types:- pack processes; chemical vapour deposition CVD; and the Silmor process, in which a SiC layer is formed by reaction of the surface of the carbon with gaseous SiO. These methods suffer from some disadvantages, such as high initial capital investment and high energy input.

The invention provides a method for protecting a substrate using sol-gel technology. The advantages of using sol-gel methods are: (i) simple, low-cost methods of application whatever the size or shape of the substrate, e.g., painting, spraying or dipping; (ii) low capital cost; and (iii) moderate energy requirements. Known protection methods are not in general as flexibly and as cheaply applicable to any size or shape.

According to the invention, a method of protecting a substrate comprises applying thereto a sol-gel precursor of silicon carbide and causing the silicon carbide to form on the surface, characterised in that either (i) the silicon carbide is made as set forth above and preferably with the removal of volatile material being allowed to take at least 24 hours; or (ii) the sol-gel comprises a filler or fillers whose coefficient of thermal expansion is within 10% of that of the substrate; or (iii) on the silicon carbide so formed, at least one further layer is applied comprising a silica-containing glass made from sol-gel.

The or each layer (iii) may be applied by brushing. These layers, in order outwards from the silicon carbide, may comprise: silica-titania glass; or silica-titania glass then SiC then silica-alumina-lithia glass; (the silica-titania glass+SiC sequence being optionally repeated); or silica-alumina-lithia glass. Other alternations of these or other materials could be used. The glass layers are preferably melted or sintered in situ to ensure a coherent sealing coating; the glass appears to soak into cracks and pores up to 200 microns deep, enhancing its protective action.

The invention will now be described by way of example.

Tetraethoxysilicate $(C_2H_5O)_4Si$ (1 mole) and phenolic resin BP Cellobond J2027L (trade mark) by British Petroleum in stoichiometric amount considering a 50% carbon yield were mixed in acetone $(CH_3)_2C\!=\!O$ (3.2 mole). The solution was refluxed for five minutes under constant agitation with a magnetic stirrer. If a drying agent was wanted, 1 mole glycerol would be added at this stage.

Meanwhile a catalyst, namely hydrochloric acid HCl (0.01 mole), was dissolved in water $H_2O$ (8 mole). The catalyst solution was added dropwise to the silicate/resin/acetone solution, starting around 40° C. and reaching % addition before 60° C. when the hydrolysis reaction provided an extra amount of solvent (ethanol), just enough to produce a clear single-phase solution. The mixture was heated to 70° C. for 2 hours for further hydrolysis. The molar ratio $H_2O$:Si was thus 8:1. Ratios of 4:1–16:1 preferably 6:1–12:1 could be used; 2:1 failed.

Alternatively and preferably, the same resin in the same amount (2 moles of available carbon) was dissolved in x moles of acetone, the silicate (1 mole, as already stated) having been dissolved in (3.2 - x) moles of acetone. In other experiments, 7 moles of acetone was used instead of the 3.2 moles described above. Carbon oxidation was slower than from an uncoated specimen. In a further experiment, the 3.2/7 moles of acetone were replaced by 4 mole acetone plus 4 mole ethanol. This gave a good result. Nearly as good was to replace the ethanol with propanol (also 4 mole); adding glycerol (e.g. 1 mole per mole of Si) made little difference.

In these last two experiments, when alcohol (ethanol or propanol) was used, the above phenolic resin in the above amount had earlier been dissolved in the acetone (4 mole, as just stated) while the silicate (1 mole, as earlier stated) was solubilised in the alcohol (4 mole, as just stated). The phenolic resin solution was added dropwise to the silicate/catalyst/water/acetone mixture and the temperature held at 70° C. for one more hour. The pH was never adjusted. (It was around 2.) The hydrolysed solutions thus obtained were allowed to gel in an oven at 60° C., and removed as soon as the mixture began to stiffen (began to be able to retain the shape of the vessel). If the mixture were not promptly removed at this stage, its subsequent application by brushing would become difficult.

Thus the mixture was initially formulated as a sol and then converted to a gel which was applied by hand-painting to a disc-shaped electrode graphite specimen, 5.45 mm diameter×1.30 mm thickness. Brush coating gives surprisingly consistent results. The gel coat was then dried in air for 48 h at room temperature and then at 60° C. in air for 4 h; this noteworthy procedure is repeated three times before firing. The dried coated specimens are fired by heating at 2C°/min to 1450° C. in flowing argon and held at 1450° C. for 4 h before cooling in flowing argon. The complete procedure of applying the gel, drying and firing is then repeated twice (or as often as necessary to achieve a desired thickness; maybe nil or one repetition can be enough in particular cases. Two firings or three firings are usually superior to any other number.) The excess of each coat of thus-formed silicon carbide tends to peel off but, when brushed clean, leaves an adherent undercoat offering a good key for the next coat.

Energy dispersive X-ray analysis shows the formation of a continuous silicon-rich coating of about 20 μm thickness; the coating also penetrated the pores of the graphite. If the silicon carbide is made too thin, carbon from the substrate can diffuse through it and degrade the silicon-based coating; thus $SiO_2$ (from glassy coating)+C (diffused)→SiO↑ +CO↑

The performance of the coatings was assessed by heating in flowing air at 920° C. and comparing the oxidation as detected by thermogravimetric analysis with that for an uncoated specimen. Carbon oxidised away from the uncoated specimen at about 2½ times the rate from the coated specimen.

Even this improvement is insufficient for long-term protection, because silicon carbide coatings on carbon are susceptible to cracking during thermal cycling as a result of mismatch of thermal expansion coefficients (CTE). The sol-gel method offers the possibility of producing a variety of multilayer coatings suitable for different technical applications and different operating temperatures, with relatively simple, inexpensive and flexible technology.

This invention describes multilayer coatings which include glass layers which are viscous at the operating temperature of the material and can therefore flow into and seal any cracks which may develop in the silicon carbide. The production of glasses and glass-ceramics by sol-gel methods is very well-developed, but has not been applied to coatings for carbons. A suitable glass coating is based upon $SiO_2$-$TiO_2$ glasses, which have a very low CTE (e.g. $\frac{1}{2} \times 10^{-6}$/° C.) and a low permeability to oxygen and which melt at about 1550° C. Another suitable coating is based upon $SiO_2$-$Al_2O_3$-LiO which also has a low CTE and a low permeability to oxygen. A particularly advantageous coating therefore has, after the SiC: $SiO_2$-$TiO_2$; SiC; and $SiO_2$-$Al_2O_3$-LiO. The last-named glass melts at about 900° C. to 1000° C., which, if sufficient $Al_2O_3$ and LiO are present, does not vary much even if the $SiO_2$ proportion has been altered by mischance.

The $SiO_2$-$TiO_2$ glass can be applied (as a sol-gel it will run into and seal cracks in the silicon carbide) to give a coating practically impervious even to helium, good to 1500° C. The $SiO_2$-$TiO_2$ glass with its low coefficient of thermal expansion (near zero at 6 wt % $TiO_2$ and negative at 9%) can elastically accept expansion of the underlying substrate.

Neither of these glasses (nor any other complex glass) can be applied by chemical vapour deposition.

The role of acetone in the silicon carbide gel is highly significant. That solvent had not hitherto been suggested in this context, but we have now found that it (probably uniquely) combines the properties that it wets carbon surfaces adequately to receive the silicon carbide, it delays gellation, it dries quickly, and it is compatible with water, alkoxysilicon and phenolic resin.

The resulting coatings can resist normal handling but cannot survive abuse such as rubbing with emery paper; the latter would in any case damage a carbon substrate too. The addition of carbon fibres can strengthen a coating, and such fibres or other carbon materials such as graphite or phenolic resin can also reduce the coating's coefficient of expansion, thus reducing the task to be performed by any vitreous sealing layer applied on top.

I claim:

1. A method of making a coherent film of silicon carbide on a surface, said method comprising the steps of:

forming a solution in a solvent of from 0.05 to 0.3 moles alkoxy silicon per mole of water, said solvent comprising 0.3 to 1.0 mole of acetone per mole of water, the solution also containing an acid catalyst and a carbonaceous material in the ratio 1 to 3 moles per mole of silicon;

allowing hydrolysis to occur;

removing volatile material after hydrolysis;

at this or an earlier stage, applying the solution to the surface; and thereafter heating the surface and solution thereon at at least 1300° C. to form said coherent film on said surface.

2. A method according to claim 1, wherein the carbonaceous material is present in the ratio 1½–2½ moles of carbon per mole of silicon.

3. A method according to claim 1, wherein the alkoxysilicon is trialkoxysilicon or tetraalkoxysilicon.

4. A method according to claim 1, wherein the acid catalyst is any of HCl, HNO$_3$, H$_2$SO$_4$ and acetic acid.

5. A method according to claim 1, wherein the solution also contains up to one mole of a C$_{1-4}$ alcohol per mole of water.

6. A method according to claim 1, wherein the carbonaceous material is any of epoxy, furan, phenolic resin and polyacrylonitrile.

7. A method according to claim 1, wherein fibers are added to the solution in a volume fraction of up to 40%.

8. A method according to claim 1, wherein the solution is formed into a sol which is allowed to gel for from 1 to 3 hours at from 50° to 70° C.

9. A method according to claim 1, wherein the solution contains 0.08 to 0.17 moles alkoxysilicon per mole of water.

10. A method according to claim 8, wherein the gel is applied to the surface.

11. A method of protecting a substrate by applying to a surface of said substrate a sol-gel precursor of silicon carbide and causing the silicon carbide to form a coherent film on the surface, said method comprising the steps of:

forming a solution in a solvent of from 0.05 to 0.3 moles alkoxy silicon per mole of water, said solvent comprising 0.3 to 1.0 mole of acetone per mole of water, the solution also containing an acid catalyst and a carbonaceous material in the ratio 1 to 3 mole carbon per mole of silicon, allowing hydrolysis to occur, removing volatile material after hydrolysis, at this or an earlier stage, applying the solution to the surface, and thereafter heating the surface and solution thereon at at least 1300° C.

12. A method of protecting a substrate according to claim 11, wherein the removing of volatile material is allowed to take at least 24 hours.

* * * * *